Figure 1:
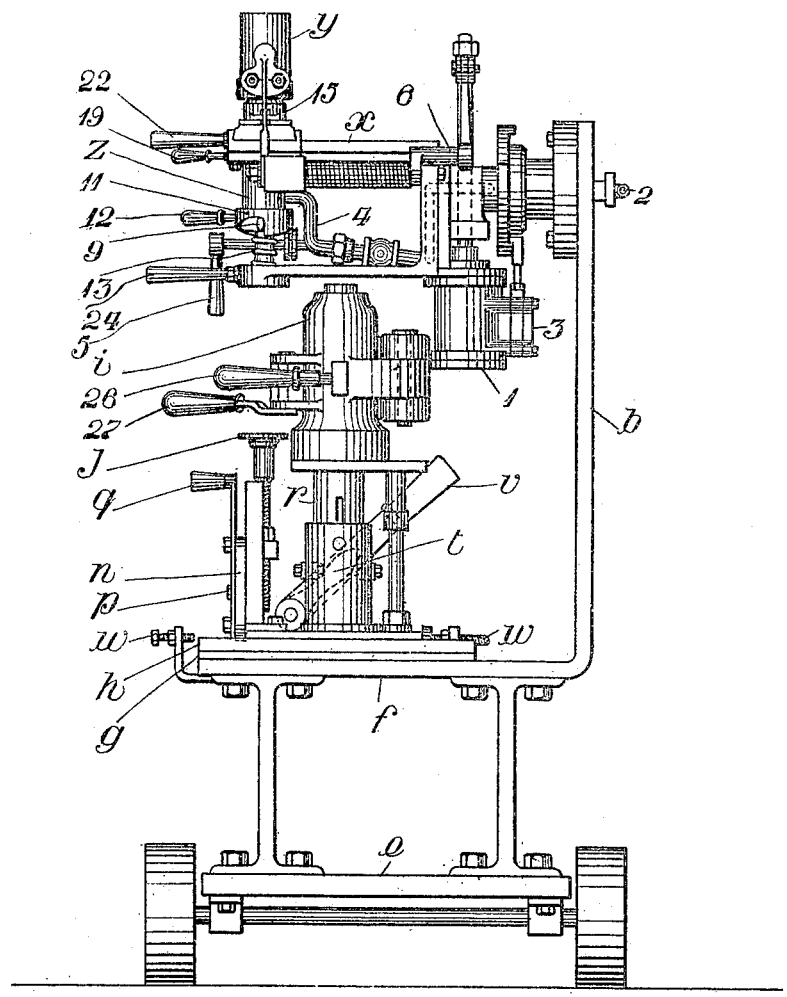

F. W. KNOWLES & G. W. INMAN.
MACHINE FOR MANUFACTURING GLASS BOTTLES, JARS, AND THE LIKE.
APPLICATION FILED AUG. 6, 1909.

957,349.

Patented May 10, 1910.

4 SHEETS—SHEET 1.

Witnesses:
M. R. Kraft
W. Allen

Inventors:
Frederick W. Knowles,
and Geo. W. Inman.
by Herbert W. Jenner.
Attorney F. W. KNOWLES & G. W. INMAN.
MACHINE FOR MANUFACTURING GLASS BOTTLES, JARS, AND THE LIKE.
APPLICATION FILED AUG. 6, 1909.

957,349.

Patented May 10, 1910.

4 SHEETS—SHEET 4.

UNITED STATES PATENT OFFICE.

FREDERICK WILLIAM KNOWLES AND GEORGE WILLIAM INMAN, OF THORNHILL LEES, NEAR DEWSBURY, ENGLAND.

MACHINE FOR MANUFACTURING GLASS BOTTLES, JARS, AND THE LIKE.

957,349.  Specification of Letters Patent.  Patented May 10, 1910.

Application filed August 6, 1909. Serial No. 511,614.

*To all whom it may concern:*

Be it known that we, FREDERICK WILLIAM KNOWLES and GEORGE WILLIAM INMAN, residing at The Glass Bottle Works, Thornhill Lees, near Dewsbury, in the county of York, England, have invented certain new and useful Improvements in Machines for Manufacturing Glass Bottles, Jars, and the Like; and we do hereby declare the following to be a full, clear, and exact description of the invention, such as will enable others skilled in the art to which it appertains to make and use the same.

This invention relates to machines for manufacturing glass bottles, jars, and the like, of the type in which a bracket carries the finishing mold under the turnover motion, a finishing mold being provided for each parison. In these machines, the paddling motion has usually been placed behind the finishing mold, and the bracket which held the finishing mold was pulled forward toward the workman to make room for the paddling motion, in operating which the workman had to come close to the hot mold.

Now according to our invention, the paddling motion is placed in front of the finishing mold, and the bracket is pushed backward underneath the turnover motion while the paddling motion is in use. In order to allow the open parts of the parison mold to clear the top of the finishing mold when turning over to receive the next charge, with the finishing mold in the position denoted, the framework of the turnover motion is lengthened, so that the parison when turned up is in front of the finishing mold, instead of behind it; and the bars which are linked at the back to the piston of the air cylinder, and at the front to the pivoted halves of the parison mold, are for the same reason made cranked instead of straight. Such machines as at present constructed are usually arranged with a single set of molds, or two sets back to back, or three or more sets of molds and turnover motions radiating from a central pillar; but we preferably place two, four, or other number of sets in parallel or side by side upon a movable carriage, or in a row upon a bench or the like. By this arrangement both space and labor are economized, as each set of molds with its appurtenances only occupies a small space in front of the furnace, say of 2 feet in width by 2½ feet in depth, and the waste of time and energy entailed by the rotary system is avoided, so that three men (one at the back and two at the front) can work four sets of molds, instead of three sets of molds as usual.

Our invention also comprises further improvements of detail as herein set forth and claimed.

Figure 2:
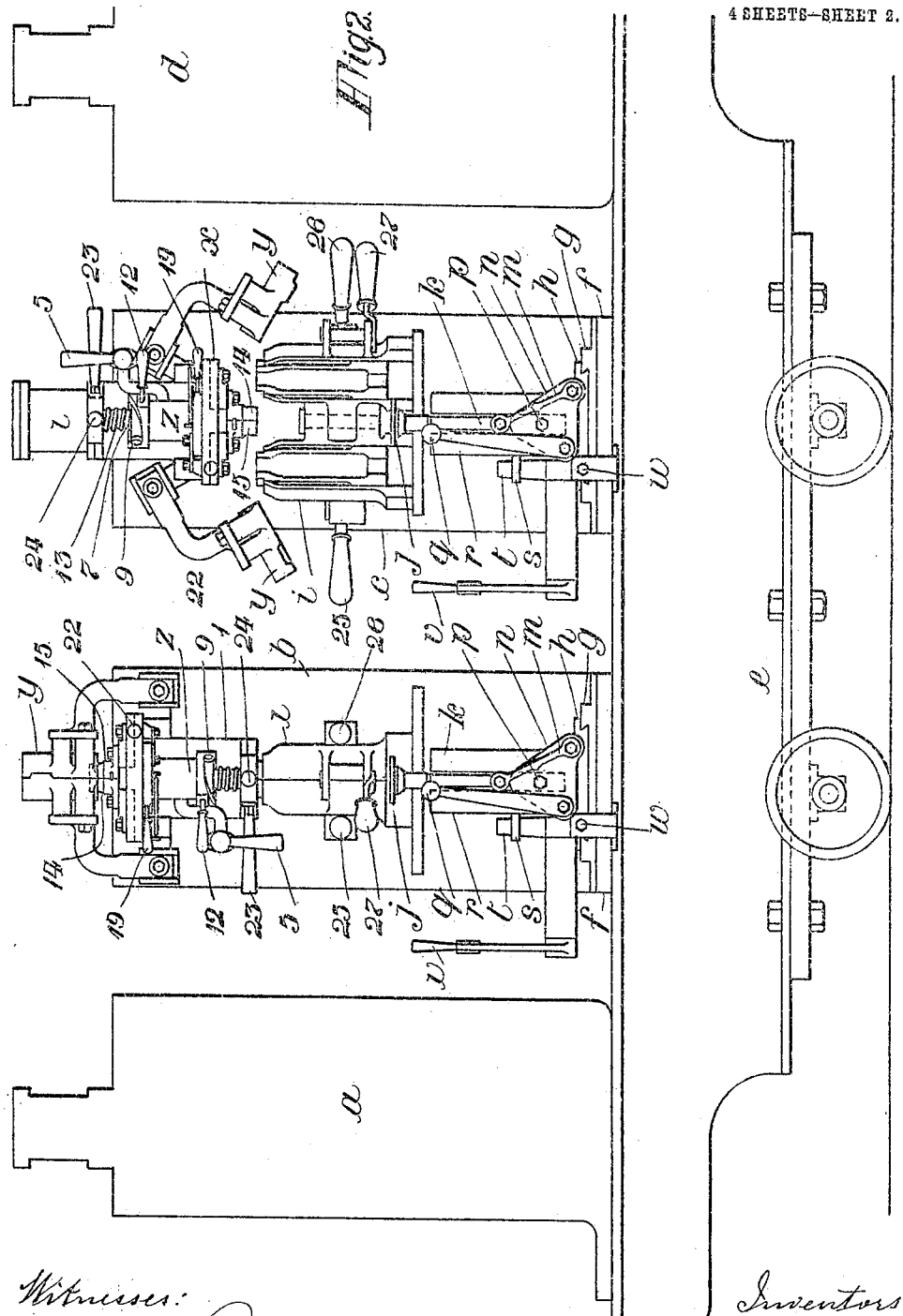
Figure 3:
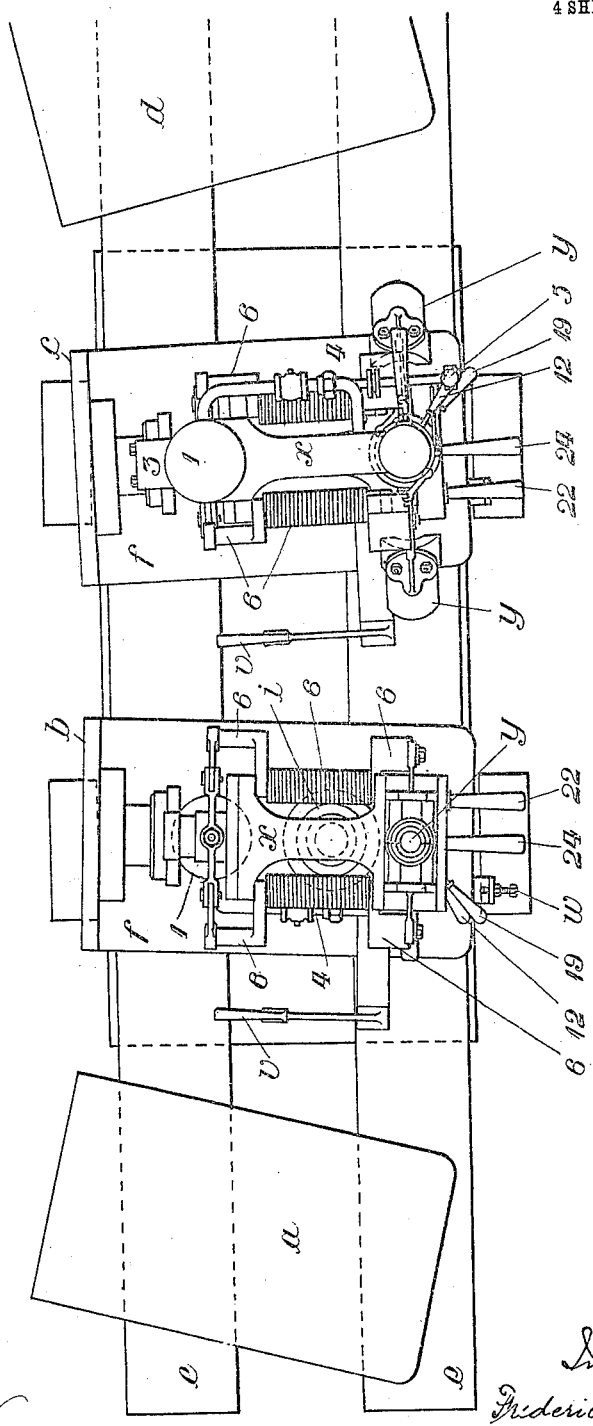
Figure 4:
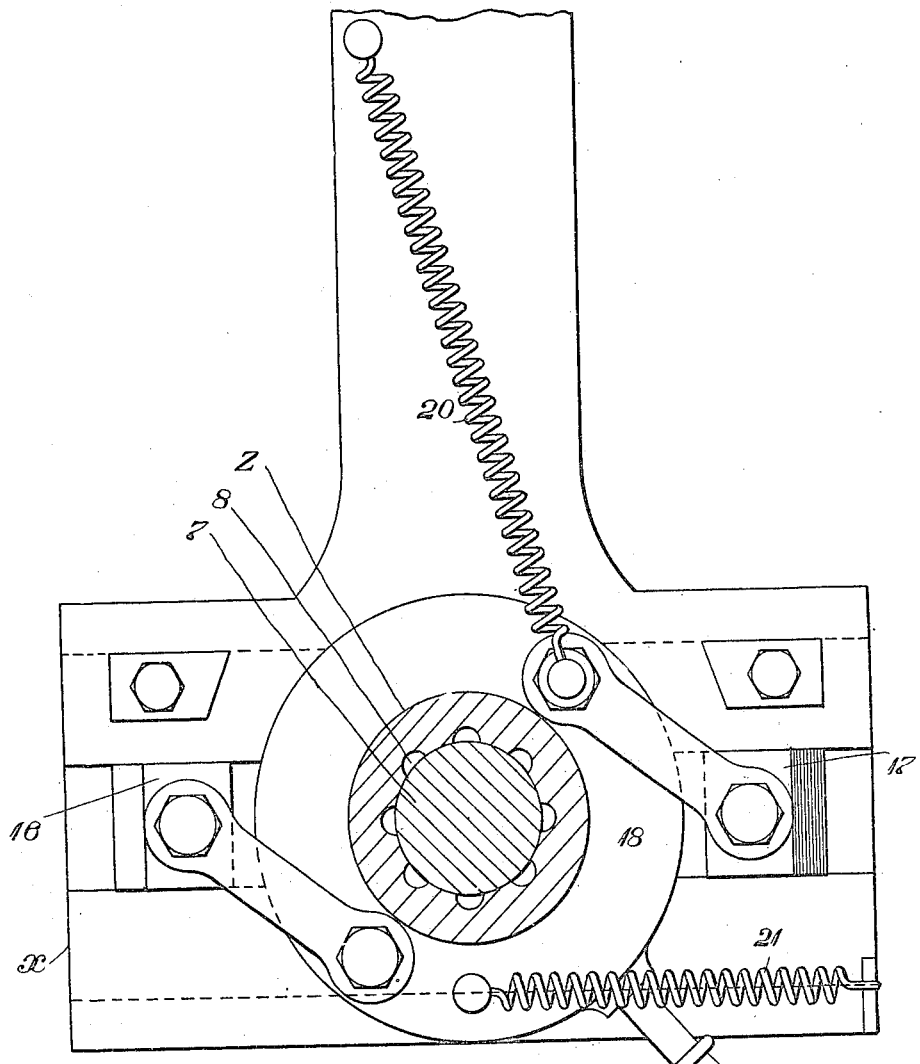

In the accompanying drawings:—Figure 1 is a side elevation of a machine constructed according to our invention. Fig. 2 is a front elevation and Fig. 3 is a plan showing the arrangement of four such machines upon a movable carriage. Fig. 4 is a sectional plan on an enlarged scale, showing the plunger or neck core mold, and the means for opening and closing the ring-mold or outer neck-mold.

Letters $a\ b\ c\ d$ indicate a set of four machines mounted upon a movable carriage $e$. The two outer machines $a$ and $d$ are represented in outline only.

Fig. 1 may conveniently be taken to correspond with the machine $b$ in Figs. 2 and 3, in which the parison is up and both molds closed, while in the machine $c$ in Figs. 2 and 3 the parison is down and both molds open.

On the bed $f$ of the machine are guides $g$ in which slides the saddle or bracket $h$ carrying the finishing mold $i$ and paddle $j$. The stem $k$ of the paddle $j$ is connected by a link $m$ to an eccentric or cam $n$ pivoted at $p$, and actuated by a handle $q$. By pressing this handle $q$ downward and to the left side, the cam $n$ is turned about its center or fulcrum $p$, and causes the link $m$ to raise the paddle $j$; and on the said handle being released, the paddle returns by gravity to its normal position.

On the pedestal $r$ of the finishing mold are two studs $s$, between which is engaged a lever arm $t$ actuated by the handle $v$ to move the pedestal $r$ and bracket $h$ backward or forward; adjustable stops $w$ limit these movements.

Letter $x$ indicates the framework of the turnover motion, carrying the parison mold $y$, the plunger cylinder $z$ and the air cylinder 1. The air is supplied at 2, entering the air cylinder through a valve at 3, and the plunger cylinder through the curved pipe 4 controlled by the handle 5. The parison mold is, as usual, opened and closed by means of the arms 6 actuated by the piston of the air cylinder 1, the cranked form of these arms 6 being clearly shown in plan Fig. 3.

The plunger or neck core mold 7 fits closely within its cylinder $z$, and to give passage to the air, a number of grooves or flutings 8 (Fig. 4) are formed in the said cylinder, so that the air is evenly delivered all around the plunger, and at the same time the plunger is kept concentric with the cylinder, and thereby with the bottle or jar. The plunger is provided at its rear or upper end with two pins 9, 10, which rest upon semicircular inclined or upwardly curved surfaces formed upon a collar 11 working upon the cylinder $z$. This collar or double cam 11 being partially rotated by the movement to the left of the handle 12, the wedge action of its cam surfaces upon the pins 9, 10, causes the plunger to rise out of the bottle neck. The spiral spring 13 returns the plunger to its normal position when the handle 12 is released.

The two halves 14, 15, of the ring mold or outer neck mold are each carried by a slide, these slides, 16, 17, (Fig. 4) being linked to a collar or boss 18 surrounding the plunger cylinder $z$. As will be obvious, a movement of the handle 19 in the direction of the arrow seen in Fig. 4 causes the slides to recede from each other, and the ring mold is thus opened; while on the release of such handle the pull of the springs 20, 21, causes the slides 16, 17, to approach each other, and thus closes the mold.

Liquid metal having been in the usual way poured into the closed parison mold $y$, this mold is turned over by means of the handles 22, 23 or 24, the parison mold opened by the cranked arms 6, the plunger lifted out of the bottle neck by means of the handle 12, the paddle $j$ actuated by the handle $q$ is caused to rise and gently strike the underside of the pendent mass of metal, the finishing mold $i$ is drawn forward by the handle $v$, closed upon the pendent metal by the handles 25, 26, locked by the handle 27, the air handle 5 actuated to admit air through the plunger cylinder $z$ to blow the bottle, the ring mold opened by the handle 19, releasing the bottle, the mold $i$ pushed back by the handle $v$, unlocked and opened, when the finished bottle can be taken out of the machine.

We claim as our invention:—

1. In a bottle-machine, the combination, with a main frame provided with a horizontal guide extending from back to front in the frame, of a slide movable in the said guide, a finishing mold secured to the said slide, a vertically slidable paddle carried by the said slide at the front part of the machine and in front of the said finishing mold, a reversible parison mold, said paddle and finishing mold being slidable back and forth under the parison mold, and a frame connecting the parison mold with the main frame and extending horizontally over the finishing mold when the paddle is directly under the parison mold.

2. In a bottle-machine, the combination, with a plunger cylinder provided with an inlet pipe for compressed air and having a series of longitudinal inlet grooves for air extending around it, of a plunger slidable in the grooved portion of the cylinder, a collar journaled on the said cylinder and provided with a means for oscillating it, an outer neck mold formed in halves and mounted on slides, and links pivotally connecting the said slides with the said collar.

In testimony whereof we affix our signatures, in presence of two witnesses.

FREDERICK WILLIAM KNOWLES.
GEORGE WILLIAM INMAN.

Witnesses:
ERNEST PRIESTLEY NEWTON,
JOSEPH LANCASTER FLEMMING.